(12) United States Patent
Evans et al.

(10) Patent No.: US 6,762,767 B2
(45) Date of Patent: Jul. 13, 2004

(54) THEME AWARE MANAGEMENT USING FUSION

(75) Inventors: Christopher A. Evans, Sammamish, WA (US); Roland L. Fernandez, Woodinville, WA (US); Richard W. Stoakley, Seattle, WA (US); Paul S. Hellyar, Kirkland, WA (US); Louis Amadio, Issaquah, WA (US); Chris J. Guzak, Kirkland, WA (US); Michael A. Schmidt, Sammamish, WA (US); Scott S. Hysom, Bellevue, WA (US); Scott R. Hanggie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 09/827,842

(22) Filed: Apr. 5, 2001

(65) Prior Publication Data

US 2002/0054046 A1 May 9, 2002

Related U.S. Application Data

(63) Continuation-in-part of application No. 09/670,791, filed on Sep. 27, 2000.
(60) Provisional application No. 60/195,512, filed on Apr. 6, 2000, and provisional application No. 60/195,593, filed on Apr. 6, 2000.

(51) Int. Cl.$^7$ ................................................ G09G 5/00
(52) U.S. Cl. ........................................................ 345/581
(58) Field of Search ................................ 345/581, 744, 345/746, 747, 762, 763, 765, 805

(56) References Cited

U.S. PATENT DOCUMENTS

| | | | | |
|---|---|---|---|---|
| 5,905,492 A | * | 5/1999 | Straub et al. | ............... 345/333 |
| 5,917,487 A | * | 6/1999 | Ulrich | ......................... 345/340 |
| 5,959,624 A | * | 9/1999 | Johnston, Jr. et al. | ...... 345/334 |
| 6,188,399 B1 | * | 2/2001 | Voas et al. | .................. 345/334 |

* cited by examiner

*Primary Examiner*—Matthew C. Bella
*Assistant Examiner*—G. F. Cunningham
(74) *Attorney, Agent, or Firm*—Merchant & Gould P.C.

(57) ABSTRACT

A system and method are described that use theming functions of a theme manager to render graphical components in a themed fashion. The theme manager uses a theme file that has theme properties for graphical components of all types. When an application is started a system is provided that determines whether the application supports theming. If the application supports theming a dynamic link controls library that supports theming is linked to the application. If the application does not support theming, the non-theming controls library is linked. If an application supports themes, application user controls and shell common controls are rendered with themes by using the functions of the theming controls library that interact with functions of the theme manager. Non-client window components are rendered using themes by intercepting render messages to windows and sending the messages to the theme manager. Non-client window components are also measured and rendered using a theme property file when appropriate in response to certain application program interface calls.

23 Claims, 7 Drawing Sheets

THEME AWARE MANAGEMENT USING FUSION

CROSS-REFERENCE TO RELATED APPLICATION

This application claims the benefit of U.S. Provisional Application No. 60/195,512, filed Apr. 6, 2000. In addition, this application is a continuation-in-part application of U.S. patent application Ser. No. 09/670,791, filed Sep. 27, 2000 and entitled Application Programming Interface For Changing The Visual Style which claims the benefit of U.S. Provisional Application No. 60/195,593, filed Apr. 6, 2000.

TECHNICAL FIELD

The present invention relates to a computer system and, more particularly, to theme aware management using fusion when rendering system components.

BACKGROUND OF THE INVENTION

Computer users in both the business and home environment have become accustomed to using a computer with a graphical operating system. For example, many users operate computers having a Microsoft Corporation "WINDOWS" operating system thereon. Certain components of these graphical operating systems are known as "controls." For example, a control may be an "OK" button, which is generally a rectangular button with "OK" written in it. By moving the cursor over the button and clicking on the mouse, a known operation will begin that is associated with the control. Many other controls exist, with examples including scroll bars, dialog boxes and sliders. Beyond controls, the graphical operating systems also draw, or render, other graphical components as needed on the display of the computer, such as the frame, the minimize box and the close box.

There are two general kinds of controls in WINDOWS: standard and custom. Standard controls are provided by the operating system. The code to create, draw and operate standard controls is contained in the common control library (DLL), a part of WINDOWS. Custom controls are all other controls. Custom controls may be created by the manufacturer of the operating system or by third parties. The code for custom controls is contained in a corresponding separate library (DLL) or within an application.

Currently, when a graphical user interface component, such as a control, is used by an application, the application requests that an instance of the component be created. Following this, the operating system transmits a generic message to the component, instructing the component to render itself. The application plays a role in routing the message from the main window to the targeted control, but the control code performs the drawing. The application uses application programming interfaces (API's) to create and interact with the control. An API serves as a software interface to be used by other programs, much as the keypad serves as an interface to a calculator. An API is a fundamental concept of high-level programming. In high-level programming, a program often does not execute tasks by itself. Instead, the program asks some other program to execute these tasks. For example, programs frequently delegate various tasks to the underlying operating system. Continuing with the above example, an application delegates the rendering of a control to the control's code.

In the prior art environment, when a generic rendering message is received by a control to draw itself, the control will draw itself using its own drawing software code. In this prior art environment, the control knows what it is supposed to look like, how it is supposed to behave, and can effectuate such a display on the user interface of the computer. Thus, the application may delegate all aspects of visual rendering to the controls, avoiding the need to contain software code to support the visual rendering of the control within the host application itself.

By utilizing the standard controls defined and rendered by the operating system, all controls will have the same appearance, regardless of the application. Users of graphical operating systems can change only a limited number of characteristics of the controls. In the "WINDOWS" operating system, a user can change the color scheme used to display the various controls and components on the monitor. The user can also select a small set of fonts to be used by the controls and components. Thus, the colors, fonts and a limited set of sizes of the controls and components may be changed. However, the basic appearance of the controls and components is dictated by the rendering software code within the control library containing the particular graphical component or control. In the prior art environment, to change the appearance of the controls or graphical components, the rendering software code must be altered. For example, if it is desired to change the appearance of the "OK" button, the rendering software code within the operating system DLL file containing the button control must be altered and the DLL file reconstructed at the binary level. If it were desired to render the button as an oval, rather than as the traditional rectangle, the software code would have to be changed accordingly. Such an approach makes it difficult, if not impossible, for a computer user and for software manufacturers, to easily alter the appearance of the controls and graphical components.

In order to enhance the user experience of the computer, it would be desirable for the user to have the ability to change the overall "look and feel" of the graphical display by changing the overall visual appearance or "theme" of the various graphical components. In other words, it would be desirable if the user could change not only the color and font of the graphical components appearing on the monitor, but to change the appearance of those graphical components as well. For example, it would be desirable to be able to alter and direct the layout of the parts of a control, and to define the shape of a control or its parts. It would also be desirable to control all aspects of how a control or its parts are drawn. Because the controls and graphical components existing within the DLL file in the prior art environment are "hard coded" with their own rendering software code, it is difficult and cumbersome to change the appearance of all of the controls and components. To do so would require recoding each of the controls to achieve the desired appearance. If multiple visual styles were required, they would each have to be predefined and each "hard coded" into every control. Moreover, the controls must also be recoded if a different rendering technology is to be used. For example, if the controls are rendered using a bitmap and it is desired to utilize a vector-based renderer, each control must be altered.

Certain prior art approaches exist that attempt to address the above situation. However, these solutions do not allow all of the controls and graphical components of the entire system to be changed. Instead, the prior art approaches address only limited portions of the set of displayed components. This allows the appearance of some controls and graphical components to be altered, leaving the remainder unaltered. Such an approach leaves an appearance that is not as coordinated as may be desired.

The prior art approaches are further limited by the techniques they employ to implement control of the appearance characteristics of visual elements of the graphical user interface. Prior art appearance modifiers operate by intercepting the generic rendering signals transmitted to the control, and, using low-level operating system graphical APIs, substitute their own rendering code for that of the control. However, only a portion of the visual elements in the graphical user interface is interceptible. Because the prior art approaches depend exclusively on the interception of operating system signals, not only are they themselves incapable of controlling the appearance of visual elements that do not function according to this protocol, they are incapable of providing a standard means for the author of the visual element to modify the rendering code to accommodate external control.

Similarly, prior art approaches for rendering non-client windows components, such as window frames and the minimize box, have shortcomings. The prior art approach requires the user to buy a separate software package in order to support theming of these components. The prior art approaches are incomplete because they allow only a fixed subset of controls to be themable. Furthermore, their implementation architecture relies solely on interception of standard window messages without any control or USER32 knowledge of the theme drawing.

In the traditional operating system, non-client window components have been rendered by a default windows procedure in Windows Kernel Mode in response to a complex set of Windows messages and API calls. It would be impractical to put all the variations of themes into the single default windows procedure. Adding theme properties to default windows procedure would require more complicated code, complete recompilation of the code, and rigorous testing to determine if the code update functions properly and doesn't break any existing applications.

Further, it is not possible to intercept all relevant signals transmitted by the operating system to a control in the course of rendering. Still further, in neither the traditional operating system nor the theming methods of separate software packages is it always possible to reproduce complex visual behavior implemented by a control, such as animated sequences. Thus, the prior art approaches, including operating system approaches and approaches taken by separate software packages, are prone to functional incompatibilities, visual flaws, and performance problems.

Moreover, the prior art techniques are limited in the manner in which software developers can design controls to accommodate versatility in visual appearance. Using traditional "Ownerdraw" and "Customdraw" routines, application developers have been able to render controls with only a limited set of options. The prior art approaches do not involve an architecture that allows a control author the flexibility to design a control that is "theme aware." Control authors are therefore not allowed the freedom needed in authoring controls to create controls that can be easily and cleanly visually altered.

Furthermore, a system that provides theme aware controls should accommodate both legacy applications and new applications that are capable of working with theme aware controls. Legacy applications have been developed and tested to work with the traditional controls that are not theme aware. New applications have been developed and tested to work with theme aware controls. A theme aware architecture must allow for both types of applications to operate on the same computer system.

For example, if a system that offers themes requires all the applications to use the theming controls even if they haven't been tested with the new controls, the application controls will not be rendered as the application developer expects. Therefore, the controls may appear inconsistent with the application's look or will be in the wrong place with respect to the application or may stop functioning altogether. Application writers should be able to control whether their applications use the new themed controls or continue using the traditional controls.

Yet another problem is that of new applications being unable to operate on traditional systems that are not theme aware. New applications will be developed and tested for new systems that provide themes. When these new applications are loaded onto old systems that are not theme aware, not only will the applications' controls not be themed, but also in many cases, the applications will fail. Therefore, there is not a way for theme aware applications to operate on non-theme aware systems.

SUMMARY OF THE INVENTION

In accordance with this invention, the above and other problems are solved by creating a theme aware version of controls and applying a software component selection technology called "fusion" to choose the theme aware version for theme capable applications. The invention includes a hook function to divert window rendering and sizing requests from the default window rendering function to a theme aware window rendering function.

One aspect of the present invention is a system and method for linking one of two sets of controls functions into an application's memory map after a determination is made whether the application supports theming capability or not. The system determines if the application has a manifest file indicating use of the theming set of controls functions. The theming set of controls is able to interact with the functions of the theme manager to render graphical components in a themed fashion.

The system and method also include an intercepting hook that intercepts render messages to windows. The intercept hook routes the render message from the default window rendering routine and sends the message to theme manager functions that render window graphical components in a themed fashion. Application program interface calls are also routed to the theme manager so that window non-client graphical components can be measured or rendered using a theme in response to the application program interface. The system and method also include methods of rendering user controls and shell common controls by using a set of theming controls functions that interact with functions of the theme manager that renders the controls in a themed fashion.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

The present invention mitigates application compatibility risks and is faster than previous approaches. In addition to isolation of controls from rendering technologies, the present invention also provides for isolation of controls from individual themes. The present invention allows a user to pick from a variety of different themes that may be pleasing to the user and enhance the user's computing experience.

Additional advantages and novel features of the invention will be set forth in part in a description which follows, and in part will become apparent to those skilled in the art upon examination of the following, or may be learned by practice of the invention.

DETAILED DESCRIPTION OF THE INVENTION

Figure 1:
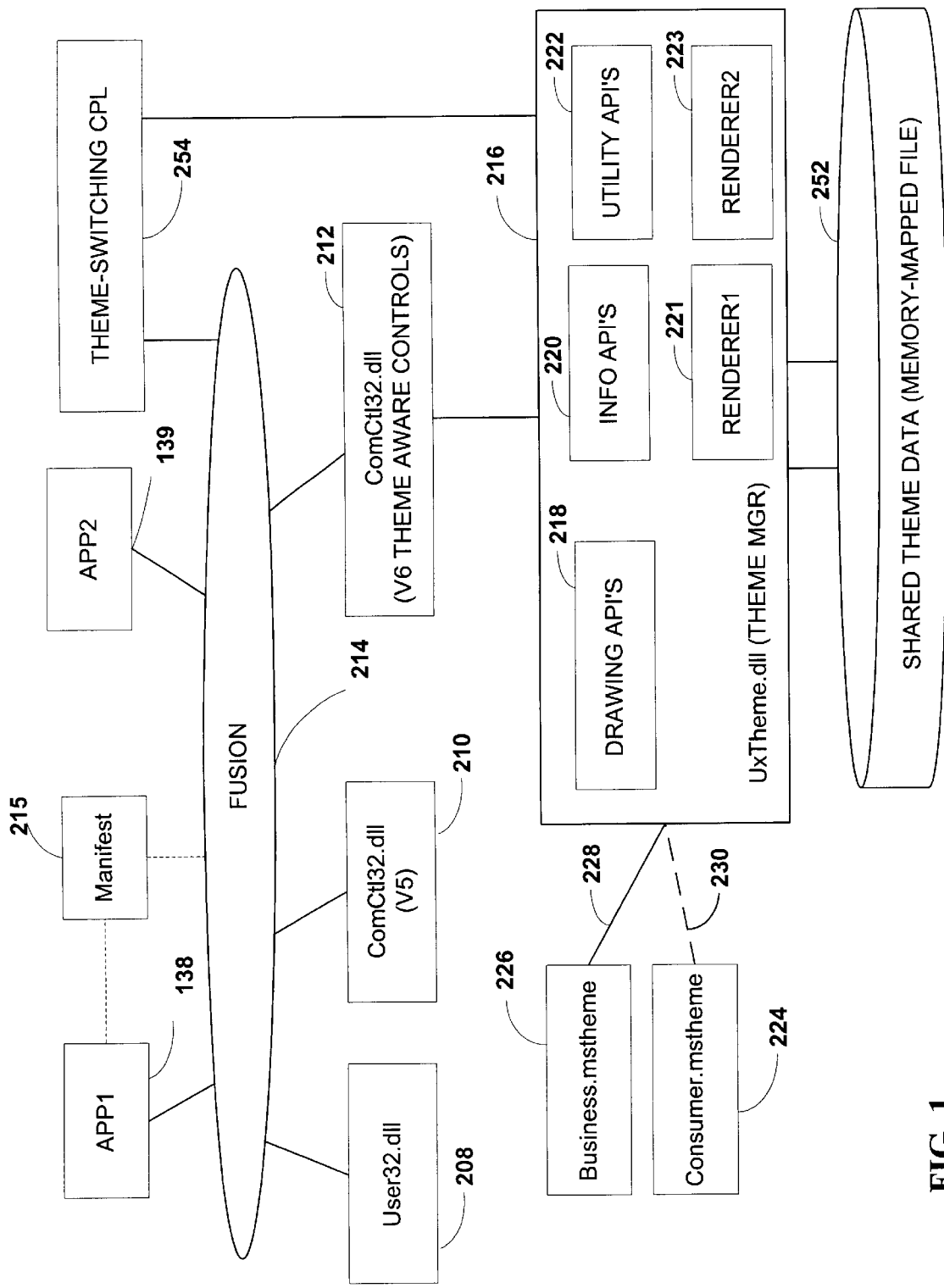
FIG. 1 is a schematic diagram illustrating the architecture used in the present invention.

In one embodiment of the present invention illustrated in FIG. 1, operating system 134 is a graphical operating system having graphically displayed controls and components associated therewith. Controls include, but are not limited to, such things as scroll bars, push buttons and sliders. Other controls are within the scope of this invention, and are known to those of skill in the art. Other graphically displayed components are also within the scope of this invention. These components include, but are in no way limited to, non-client sections of the windows in the display, such as the frame surrounding an application display on the user interface, the minimize box, and the close box.

In FIG. 1, the basic architecture used in this embodiment of the present invention is illustrated. If the reader is already familiar with the operations of the theming system due to familiarity with the related patent application identified above, then it is suggested that the reader proceed to the description of FIGS. 4 and 5 to understand embodiments of the present invention related to a theme aware architecture for theming system components. The architecture is illustrated with example applications 138 and 139 that are open and running on the computer 110. As an application, such as APP1 138 is running it often requires a control or graphical component to be rendered, or displayed, on the monitor 191 of the computer 110.

In FIG. 1, libraries 208, 210 and 212 are linked to the applications 138 and 139 through a fusion module 214. Fusion module 214 enables the theming of controls in applications without needing to change the applications themselves to request the themable version of the controls. Fusion module 214 enables applications 138 and 139 to load the specific version of the DLL 208, 210 or 212 at run time through the use of a manifest 215. The fusion manifest 215 specifies the environment in which an application will run, which allows multiple versions of a DLL to exist on one machine. Thus, fusion module 214 will map the request for a component so that it is rendered as a themable element in DLL 212 instead of a non-themable element from DLL 208. This allows an existing application to be themed without changing code of the application. Fusion module 214 also allows the new themable control to be placed in a different DLL from the existing DLL, which simplifies implementation and minimizes compatibility risks.

Figure 2:
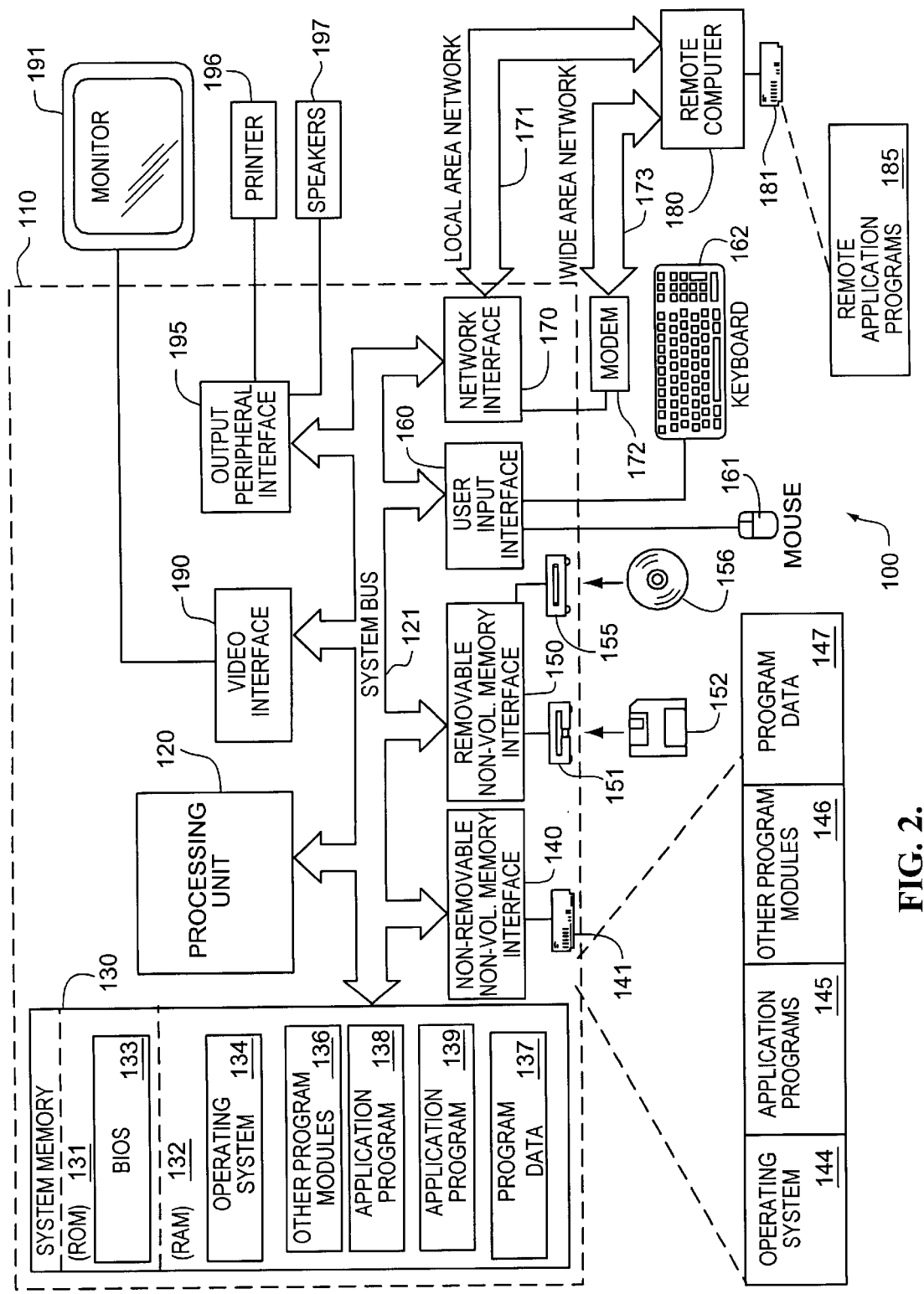
FIG. 2 illustrates a suitable computing system environment for use in implementing the present invention.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 138 and 139, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 138 and 139, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Those skilled in the art will understand that program modules such as the operating system 134, application programs 138 and 139, and data 137 are provided to the computer 110 via one of its memory storage devices, which may include ROM 131, RAM 132, hard disk drive 141, magnetic disk drive 151 or optical disk drive 155. Preferably, the hard disk drive 141 is used to store data 137 and programs, including the operating system 134 and application programs 138 and 139.

When the computer 110 is turned on or reset, the BIOS 133, which is stored in the ROM 131 instructs the processing unit 120 to load the operating system from the hard disk drive 141 into the RAM 132. Once the operating system 144 is loaded in RAM 132, the processing unit 120 executes the operating system code and causes the visual elements associated with the user interface of the operating system 134 to be displayed on the monitor 191. When an application program, such as application 138 is opened by a user, the program code and relevant data are read from the hard disk drive 141 and stored in RAM 192.

Figure 3:
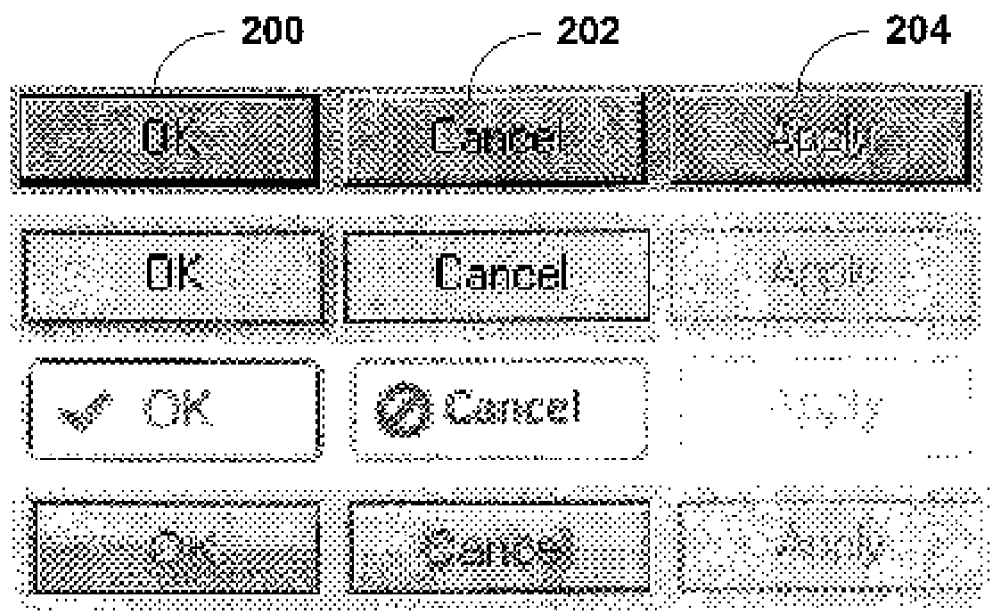
FIG. 3 is a representation of examples of graphical components having different themed appearances.

An example display of graphical components having a variety of appearances is seen in FIG. 3. As shown in FIG. 3, the controls may take the form of an OK button 200, a Cancel button 202 and an Apply button 204. The present invention allows the appearance of the controls and other components to be visually changed to better suit the desire of the computer user. The invention allows the appearance of the controls to be altered beyond color and font selection. For example, the layout of the parts of a control can be defined as desired. For example, a scroll bar could be rendered with the up and down arrow buttons adjacent to each other at the bottom of the scroll bar, instead of the up arrow and the top and the down arrow at the bottom. Further, the shape of the control and its parts may be defined. As shown in FIG. 3, four different overall appearances are shown for each of the buttons 200, 202 and 204. Each different appearance setting is coordinated and is called a "theme." Each theme is represented by one of the rows of buttons in FIG. 3. While only four themes are shown in FIG. 3, an unlimited variety of themes may be created for selection by the computer user. The theme is a collection or set of appearance characteristics relating to a particular subject or desired visual environment. As described below, the present invention allows the user of the computer to specify which of a number of predefined themes is to be applied to the controls and other components of the visual display. Moreover, the present invention allows new visual themes to be added to the system without the need of changing the software code of the controls and other graphical components. Still further, the present invention allows addition of new rendering technologies or modification of existing rendering technologies without changing the software code of the controls and other graphical components.

As an application, such as APP2 139 in FIG. 1, is running it often requires a control of graphical component to be rendered, or displayed, on the monitor 191 of the computer 110. For example, with reference to FIG. 3, the display of an OK button 200—may be needed by the application on the monitor. Application 139 requests that an instance of button 200 be created. Following this, the operating system transmits a generic message to the control instructing it to draw itself. This request would be routed to the dynamic link library (DLL) that contained the particular control. As an example, the DLL in the WINDOWS operating environment would be called User32.dll or ComCt132.dll(V5), shown as 208 and 210, respectively, in FIG. 1. Libraries 208 and 210 exist within graphical operating system 134. Libraries 208 and 210 are typically linked by default with application 139. As will be discussed later, the linking of libraries 208 and 210 can be overridden by use of fusion 214. The defined control with libraries 208 and 210 contains the drawing code needed to render the control on the monitor. Therefore, to change the appearance of controls in libraries 208 and 210, the software drawing code must be changed for each control within libraries 208 and 210.

An additional library DLL, shown as 212 in FIG. 1, is similar to library 210, in that it contains a number of predefined controls and graphical components that may be used by application 138. Broadly, DLL 212 contains a number of components that are to be graphically displayed. In library 212, however, the controls are defined differently, making them "theme aware." Rather than containing all of the software code needed to render the control in multiple visual styles, the controls are defined with certain basic information or values about the control, for example, the location, parts and states of the controls.

The location is the position on the user interface where the control is desired. Parts are the different items that make up the control. As an example, a scrollbar control has an elongated rectangular shaft part, a smaller thumb part that slides within the shaft part, and an arrow part at each end of the shaft part. The state of a control describes the current appearance, which reflects the functional state of that part. For example, a button can be active, pressed, hot (when the mouse is over the control), disabled or inactive.

The controls within DLL 212 also contain the drawing code needed to render the controls if no themes are selected, as well as the theme-aware paths through the code. DLL 212 requests rendering or drawing services from a theme manager DLL 216. Theme manager 216 provides the requested rendering services and draws the control on the display at the indicated location, with the indicated parts in the indicated states.

Theme manager 216 contains a series of APIs that allow library 212 to interact and communicate with the theme manager. The APIs allow a control author to define a control within DLL 212 as a series of parts and states without the need for software rendering code. These APIs are generally divided into three types: drawing APIs 218, information APIs 220 and utility APIs 222. Drawing APIs 218 are generally used to render and assist in the layout of the needed control parts and other components. Information APIs 220 are generally used to obtain information about the current defined appearance of the controls to allow controls to be individually customized. Utility APIs 222 are those APIs used by parts of the operating system other than the controls, to control theme selection. Utility APIs 222 include functions that can be used to enumerate installed themes and load one of them.

Drawing APIs 218 are a collection of theme-aware drawing services. Each individual API within the set of drawing APIs 218 is used to perform a different drawing service. Generally, each API requires a specified part and state of the graphical component at hand. An API called "DrawThemeBackground" is provided that draws the theme-specified border and fill for the specified part and state at the desired location. Similarly, an API called "DrawThemeText" is provided that draws the specified text using the theme-specified color and font for the specified part and state.

As an example, if an OK button 200 (FIG. 3) was requested by an application 138, the control within DLL 212 would pass the part, state and location information to drawing APIs 218 through a function call, such as DrawThemeBackground, or DrawThemeText. As is more fully described below, this part and state information is matched with appearance characteristics and theme manager 216 draws the control on the monitor. Drawing APIs 218 further include an API called "GetThemeBackgroundContentRect." This API allows the control to obtain the size of the content for the theme-defined background. Usually, this is the area inside the borders or margins. By using this API a control can determine the available area within the background in which items may be placed. When using this API, the control within DLL 212 is requesting information regarding a graphical component with a specified part and state. This information is obtained by the theme manager 216 and returned to the control. A similar API called "GetThemeBackgroundExtent" is provided that calculates the size and location of the theme-specified background for the specified part and state given a content rectangle. This API may be used when the content is known, and based upon that content, the outer boundary for the theme background needs to be determined. Another API called "GetThemePartSize" is provided to retrieve the theme author specified minimum and normal sizes of a control part.

Drawing APIs 218 further include an API entitled "GetThemeTextExtent." This API is used to calculate the size of a specified text when rendered in the theme font. This API can therefore be used to determine the width and height of a given text string. The control author can thus specify a part and state having text associated therewith and use this API to obtain information from theme manager 216 regarding the size of the text string. Similarly, another API entitled "GetThemeTextMetrics" is available that can be used to obtain size information about the font being used. Therefore, this API may be used to obtain information such as the width of an average font character. In other words, this API is used to obtain from theme manager 216 information that the control needs regarding the size of a theme-specified font.

An API entitled "GetThemeBackgroundRegion" is also provided within drawing APIs 218. Within some operating systems, a region is a way to describe a non-rectangular shape. A region can also be thought of as an image with transparent parts. This API is used to compute the region for a regular or partially transparent theme-specified background. In other words, this API may be used to determine what is transparent and what is opaque within the framed background for a specified part and state. Thus, this API supports the definition of non-rectangular shapes of controls and parts. Similarly, an API entitled "HitTestThemeBackground" is provided. This API is used to determine whether the point within the background for the specified part being clicked is in a transparent or an opaque area. This API is used by a control within DLL 212 to obtain information from the theme manager 216. If the click is within a transparent area, no action may be needed. Conversely if the click is within an opaque area, an action may be required.

Another API contained within drawing APIs 218 is entitled "DrawThemeLine." This API allows a theme to define a generic style of a line. This generic style may be accessed and used for a specified part by calling the "DrawThemeLine" API. Similarly, an API entitled "DrawThemeBorder" is provided that allows a theme-defined border to be specified. The theme-border may be drawn for a specified part utilizing this API.

An API entitled "DrawThemeIcon" is provided that allows a theme-defined icon to be rendered that may include theme-specified special effects. For example, a theme-icon may have a different appearance when the mouse is directly over the icon, such as a glowing appearance.

Drawing APIs 218 also contain an API entitled "IsThemePartDefined" that may be used to determine if the theme has defined parameters for the specified part and state. If the part is not defined within the theme the control can draw this part itself. If the part is theme defined, theme manager 216 will render the part according to the theme defined information. Another API is provided entitled "IsThemeBackgroundPartiallyTransparent." This API is used to determine whether or not the background is a rectangle or region that has a transparent part. This API may be used to simplify the control code. If there is no transparency within the background, then there is no need to conduct any hit testing through the use of the "HitTestThemeBackground" API.

Importantly, drawing APIs 218 further include an API entitled "OpenThemeData." This API is used to obtain the handle for a list of class names. A class name list identifies a set of graphical components, and may be divided into parent class names and one or more child class names. For examiner, a parent class name might be button. A child class name for that parent class might be "start button." A handle is a reference to an internal structure detailing various information and properties of the object. Theme manager 216 will search for each class name in the list and use the first matching theme information found. For example, if the class names included both start button and button, the start button theme information would be used if it existed. If start button theme information did not exist, the theme information for a button would be used. If no value is found the old code will be used to render the control. If any non-0 value is returned, a valid theme handle is established. This theme handle will be returned to DLL 212 and used for all of the theme drawings.

Similarly, another API provided is entitled "CloseThemeData." This API is used when the control is closed, such as a button no longer being needed, or when the theme is changed, as is more fully described below.

Another API provided is entitled "IsThemeActive." This API allows a control within DLL 212 to obtain a true or false answer as to whether there is a current theme in effect. This API can thus be used to determine whether to call the "OpenThemeData" API or merely use the existing drawing code where the controls will render themselves.

As described above, theme manager 216 also contains a set of information APIs 220. These information APIs 220 allow controls to be individually customized. In other words, these APIs are utilized in only certain instances and may be used to obtain information about specific controls. These information APIs are used to query theme manager 216 for defined theme information regarding specified properties of the theme. Each API 220 thus requests information, which is provided by theme manager 216.

Within information APIs 220 is an API entitled "GetThemeColor." This API utilizes the specified part and specified state along with a specified color property identifier to obtain information about the theme color. The property identifier is the color property number that is desired. In other words, the color API is used to ask for the color value corresponding to the property desired, such as the background color. Another API called "GetThemeMetric" is provided that requests and receives a size value for a specified property identifier. This size value will be an integer. An API entitled "GetThemeString" is also provided within information APIs 220. This API is used to obtain the string for a specified property identifier. The string will include information regarding the number of characters in the string and where the string is terminated.

Another API is provided within information APIs 220 entitled "GetThemeBool" that will return an integer that is either 0 or 1 for a given part, state and property. The 0 and 1 correspond to a false or true state for that part, state and property. Another API provided is entitled "GetThemeInt." That will return an integer value for a specified part, in a specified state with a specified property identifier. Similarly, an API is provided entitled "GetThemeEnumValue" that will return the theme-enum for the specified part, state and property identifiers. An enum is merely a variable that holds numeric values which correspond to symbolic information. For example, an enum for alignment might be left, middle, right corresponding to the numbers 0, 1, 2.

Another API entitled "GetThemePosition" is provided that will return two integer values, corresponding to an x-location and a y-location for a specified part in a specified state with a specified property identifier. Another API provided within information APIs 220 is entitled "GetThemeFont." This API is used to obtain a logical description of the font theme used, given a specified part, state and property identifier.

Yet another API provided within information APIs 220 is entitled "GetThemeRect." This API will return four integers representing the left, right, top and bottom of the specified part, state and property identifier. Similarly, an API entitled "GetThemeMargins" is provided that will return four integers representing a left space, right space, top space and bottom space given a specified part, state and property identified. There is also an API entitled "GetThemeIntList" which returns the value of a specified property whose type is a list of integer values. Finally, an information API entitled "GetPropertyOrigin" is provided that returns the location from which the property originated. This API allows the control author to obtain information for the property origin. In other words, the API allows the control author to determine whether the property was specified on the state, part, class, global or was the property not found. This is needed because theme properties are specified by the theme author in a hierarchical fashion. For example, if a property is not specified at the "state" level, the theme manager will search the "part" level, "class" level, and finally the "globals" level for the property. Sometimes it is important for the control to know if a property was explicitly defined for the part/state it is processing. There is also an API entitled "GetThemeFilename" which returns the string value of the specified filename property.

Another API provided within information APIs 220 is entitled "SetWindowTheme." This API allows a control author to redirect a control window to use a different set of theme information than its class would normally use. In other words, this API allows a control to be used while giving the control a special look other than the standard look defined by the theme for that class. This API may use additional parameters to identify a particular application and class name. This allows a theme author to use the specified class but to change the appearance of that class. For example, a button may be defined that has a given button appearance. Utilizing this API, this button can be redirected to a different class name. For example, "OKButton" may be specified. The theme author will then be able to use a class called "OKButton" and the "OKButton" will have a different appearance from the standard button appearance.

There is also a subset of theme metrics APIs within the information API group that parallel the WINDOWS system metrics, but which are specific to a theme. Unlike normal control-based properties, these properties are available to and shared by all controls. "GetThemeSysColor" returns the theme-specified color value of the specified system color index. "GetThemeSysColorBrush" returns a handle to a drawing brush that is the color of the specified system color index. "GetThemeSysSize" returns the integer size of the specified theme size index. "GetThemeSysBool" returns a boolean (0 or 1) value for the specified theme boolean index. "GetThemeSysFont" returns a logical font structure for the specified theme font index. "GetThemeSysString" returns a string value of the specified theme string index.

There are also some application-oriented API's within the information API group 220. "IsAppThemed" returns a boolean (0 or 1) value indicating if the application is being themed by the operating system. "GetWindowTheme" returns the most recent theme handle, if any, opened for the specified window. "GetThemeAppProperties" returns the flags that control which parts and types of windows are themeable within the application. "SetThemeAppProperties" allows the application to set these same flags.

Finally, there are information API's 220 for error handling. "GetThemeLastErrorContext" returns the error context (including error code, error code parameters, filename and source line) associated with the last reported theme error on the current thread of execution. "FormatThemeMessage" returns the error string for the specified error context in the specified language.

Theme manager 216 includes not only drawing APIs 218 and information APIs 220, but also a set of utility APIs 222. These APIs may be used to achieve a variety of results.

Drawing APIs 218 and information APIs 220 allow the author or creator of controls within DLL 212 to define the controls as a series of parts and states. The defined control is therefore abstracted from the rendering process of theme manager 216 and is also abstracted from the theme-defined appearance information or characteristics, as is more fully described below. Using APIs 218 and 220 the control author can create controls that are "theme-aware" and that are equipped to communicate with theme manager 216. This communication involves passing basic information or values to theme manager 216 that allow the theme manager to render the desired control, having the needed parts in the desired states.

Theme manager 216 also contains the renderers needed to execute the drawing instructions. For example, a border-fill renderer 221 could be used that allows different color themes to be applied to the controls. As another example, a bitmap renderer 223 could be used that defines the control parts as images. Other examples of renderers include using a vector definition language, portable network graphics (PNG) files, or portable document format files (PDF). It should be understood that the present invention is not limited to a particular rendering technology. If a different renderer is desired or needed, the drawing code of theme manager 216 is revised to add the renderer to theme manager 216. The controls within DLL 212 are therefore isolated or abstracted from the rendering technology within theme manager 216. This allows different renderers to be added to theme manager 216 without having to revise the controls within DLL 212, as is more fully explained below.

The renderer within theme manager 216 renders the requested control according to an appearance theme that has been selected by the user of the computer. For example, appearance themes 224 and 226 are shown in FIG. 1. As shown, theme 224 may be a consumer theme and theme 226 may be a business theme. It should be understood, however, that other themes could be used and that the invention is in no way limited to the particular theme. For example, other themes could include a cartoon theme, a children's theme or a golf theme. As seen in FIG. 1, business theme 226 has been selected by the user, as represented by the solid line 228. Consumer theme 224 is available for selection, as represented by the broken line 230.

Figure 6:
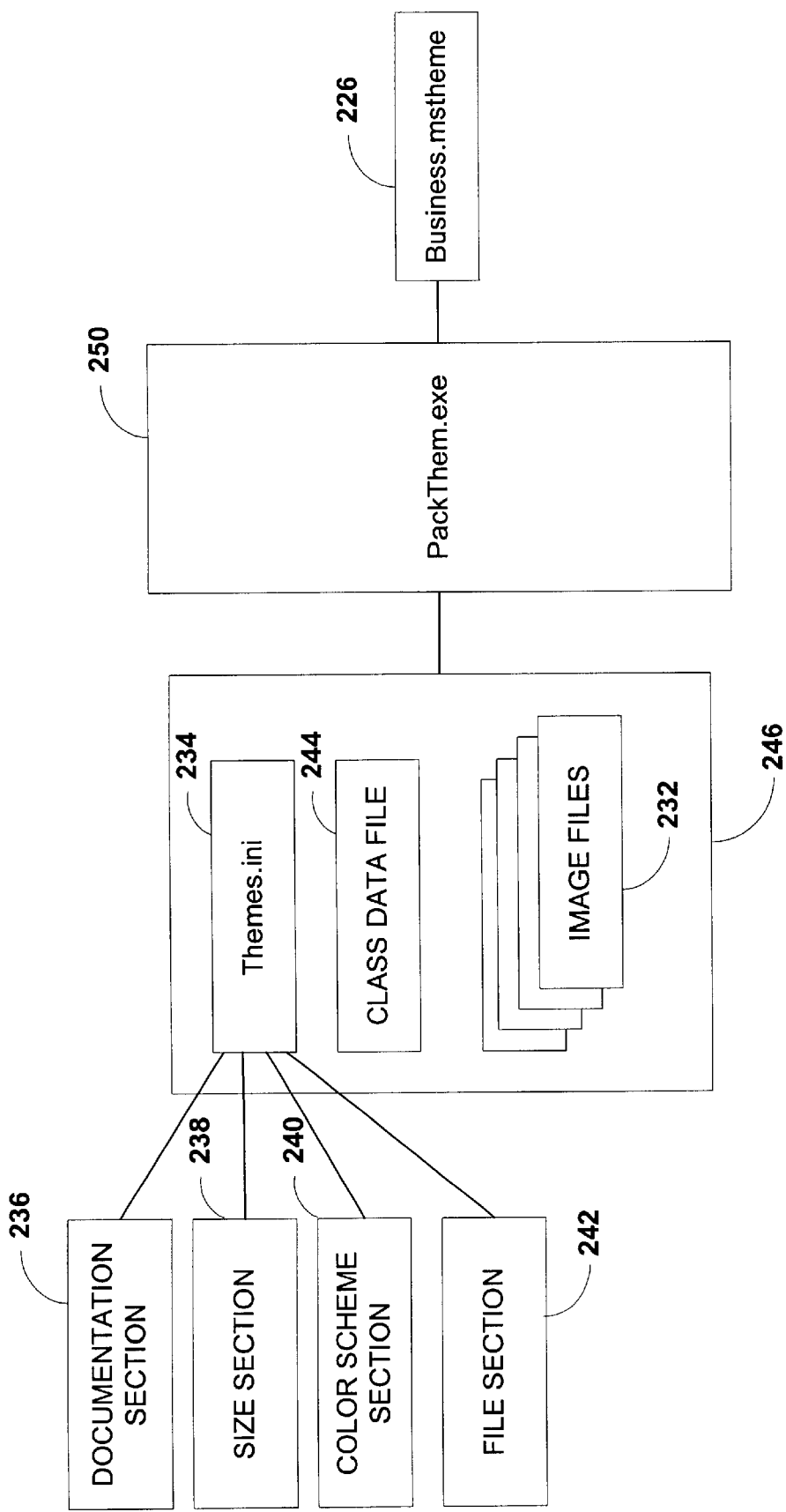
FIG. 6 is a schematic diagram illustrating the architecture of a theme file.

Each theme 224 and 226 has similar architecture. As seen in FIG. 6, business theme 226 includes a series of image files 232. Image files 232 are the image files that will be used by the particular theme. In this case, image files 232 are the image files that will be used by business theme 226. Business theme 226 also includes a themes.ini file 234. File 234 is a text file and can be created in either ANSI or UNICODE character sets. File 234 specifies the available color schemes and sizes available for the theme. In the case of theme 226, file 234 specifies the available color schemes and sizes available for business theme 226. File 234 therefore represents all of the variations of the theme to which it applies.

Theme file 234 consists of one or more sections. The sections within theme file 234 include a documentation section 236, a size section 238, a color scheme section 240 and a file section 242. Documentation section 236 is optional and may contain any property name. Size section 238 specifies the size name, such as "default size," "very small" or "very large." Color scheme section 240 is used to specify a simple color scheme name and an optional color scheme transformation associated with the color scheme name. File section 242 is used to specify a unique name for the class data file. The file section 242 will include a file name, a color scheme (from color scheme section 240) for that file name, and the sizes (from the size section 238) that the file will support.

Theme 226 includes a second .ini file labeled 244 in FIG. 6. File 244 is a class data file that contains the theme data for a specific size and color theme. File 244 may also contain defining sections. For example, file 244 may contain a globals section that defines the properties of the particular class of control. File 244 may also contain a section that allows the system metrics to be obtained and used. Finally, file 244 may contain a group of class sections. Each class section name contains a class name, an optional part name, and an optional state name. Within the section are the property/value pairs that define the appearance of the specified part or control. For example, a class name would be "slider" for the slider control. A part specified for the slider would be "track." States defined for the track part would be "normal," "disabled," and "hot." The class section name can also include an application (or "group") name, which specifies that the section only applies to a specific application (or "group" name, as specified by the SetWindowTheme API).

Image files 232, theme file 234, including file 244 are broadly grouped together to make up theme directory 246. Theme directory 246 and a system schema file located within the theme manager 216 are used to load business theme 226. The system schema file is the file that defines property numbers for all of the properties involved in a particular theme and is basically a master definition file that allows the themed properties to be assigned a number corresponding to a defined appearance.

Theme directory 246 thus contains a theme.ini file 234, a class data file 244 and all of the image files 232 used by the theme. The contents of theme directory 246 can be packaged into a DLL file by packthem tool 250. Packthem tool 250 processes the theme.ini file by parsing it against the schema file for syntax errors and adding the .ini file to the package being built. Recognized properties from documentation section 236 are written to a package string table. Color scheme information from color scheme section 240 and size information from size section 238 is also written to a package string table. Each class data file 244 is also processed. As the class data file is processed, the file is parsed against the schema file for syntax errors. The class data file is also added to the package being built.

The DLL file produced by packthem tool 250 is business theme file 226. File 226 contains the theme data and this theme data is isolated from control library 212. This allows different themes to be created and selected without changing the controls defined within library 212. Thus, control authors can create and define controls independently of the appearance or theme data. File 226 is in binary format and is passed into a shared theme data file 252 when business theme 226 is selected by the computer user, as best seen in FIG. 1. File 252 is a shared memory map file that can be accessed by all processes. Thus, when a theme is selected by the computer user, theme manager 216 will read the information for a defined theme file, such as file 226, and will place that information in a binary format in file 252 where all running processes have access to the binary information.

As best seen in FIG. 1, a theme-switching control panel 254 is provided that is in communication with theme manager 216. Panel 254 cooperates with a user interface that displays the available themes from which the user can select. As shown in FIG. 1, control panel 254 would allow a user to select business theme 226 or consumer theme 224. If, as has been discussed above, business theme 226 is selected and the user of the computer switches to select consumer theme 224, theme 224 will be loaded into shared memory map file 252 as binary data. Theme manager 216 also sends a message to each theme-aware control within DLL file 212 that the theme has changed. Each theme-aware control knows how to respond to this message.

When the theme-aware control receives a message that the theme has changed, the control will close the current theme handle that was received via the OpenThemeData API. The control will then attempt to open a new theme handle, again using the OpenThemeData API. If a new theme handle cannot be opened, the control knows that the theme has been switched off for that control and that the old drawing code is to be used by the control to draw itself. If a new theme handle is opened, theme manager 216 will look at the theme binary data and will start a new drawing routine so that all of the theme-aware controls are redrawn utilizing the newly selected theme, such as consumer theme 224. Any information that was cached regarding the previously selected theme is invalidated and that information must be recalculated.

Figure 7:
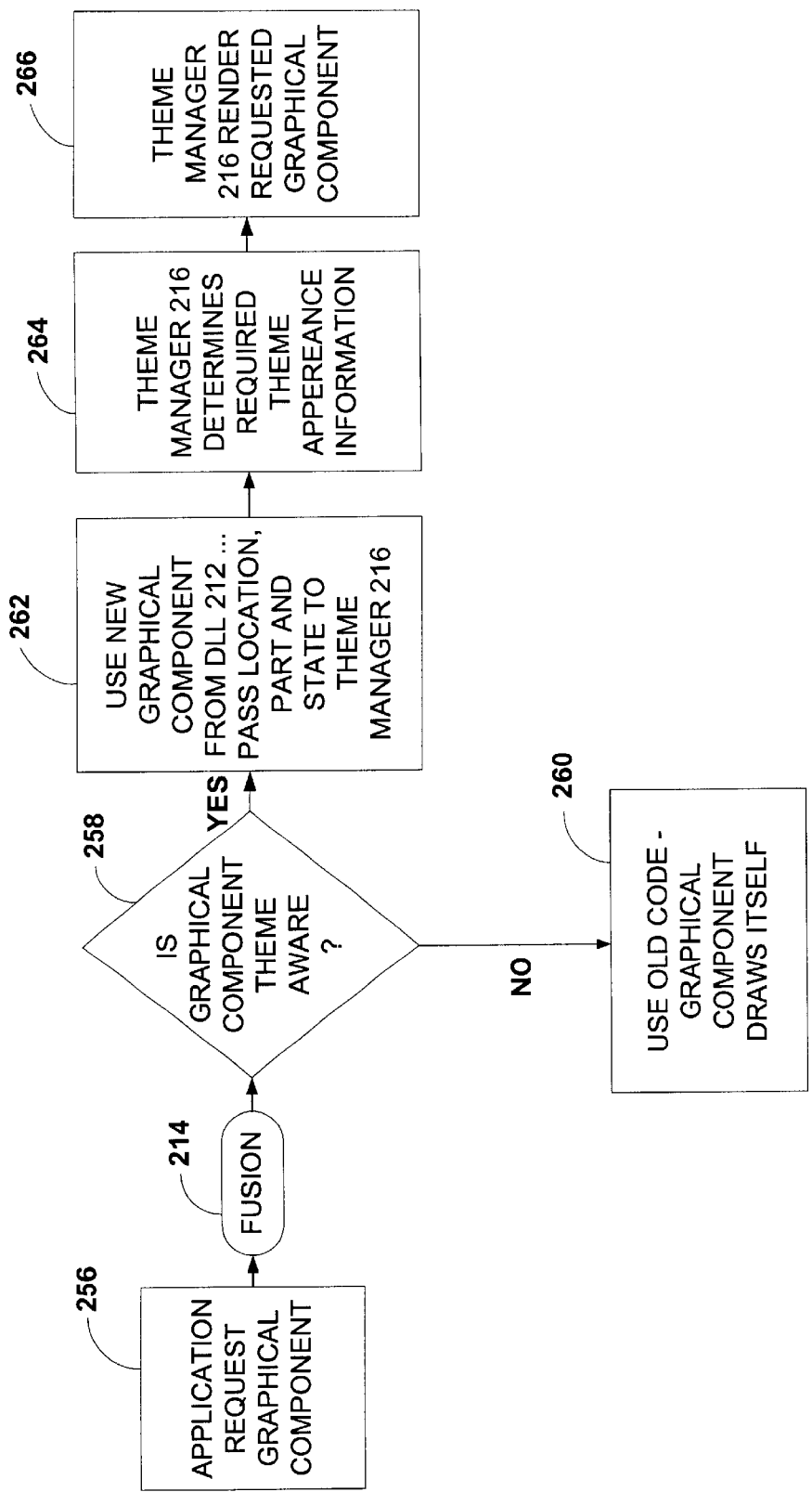
FIG. 7 is a flow chart illustrating use of the present invention by an application in requesting a graphical component.

In operation, as is best seen in FIG. 7, an application 138 or 139 will request a graphic, such as a control, to be rendered on the user interface, as represented at 256. This graphical request is routed through fusion 214. As represented by 258, the fusion process will determine if the requested control is a theme-aware control. If the control requested is not theme-aware, the old code is used and the control will draw itself using a control from DLL 208 or 210, as represented by 260 in FIG. 7. If the control is theme aware, the graphical request is processed in DLL 212, as is represented by 262. The controls within DLL 212 will pass basic information for the graphical request, such as the part, state and location for the requested control to the theme manager 216 in a request for rendering services, using APIs 218, 220 and 222. Thus, the graphical request is processed in DLL 212 without application of the appearance characteristics that are found by theme manager 216. Theme manager 216 will then determine or apply the theme-specific appearance characteristics for the given control part and state, as shown by 264. This appearance data is retrieved from the shared memory map data file 252. Using the retrieved appearance data, for the requested control part and state, along with the location, the theme manager will render the control on the display of the computer, as represented by 266.

Figure 4:
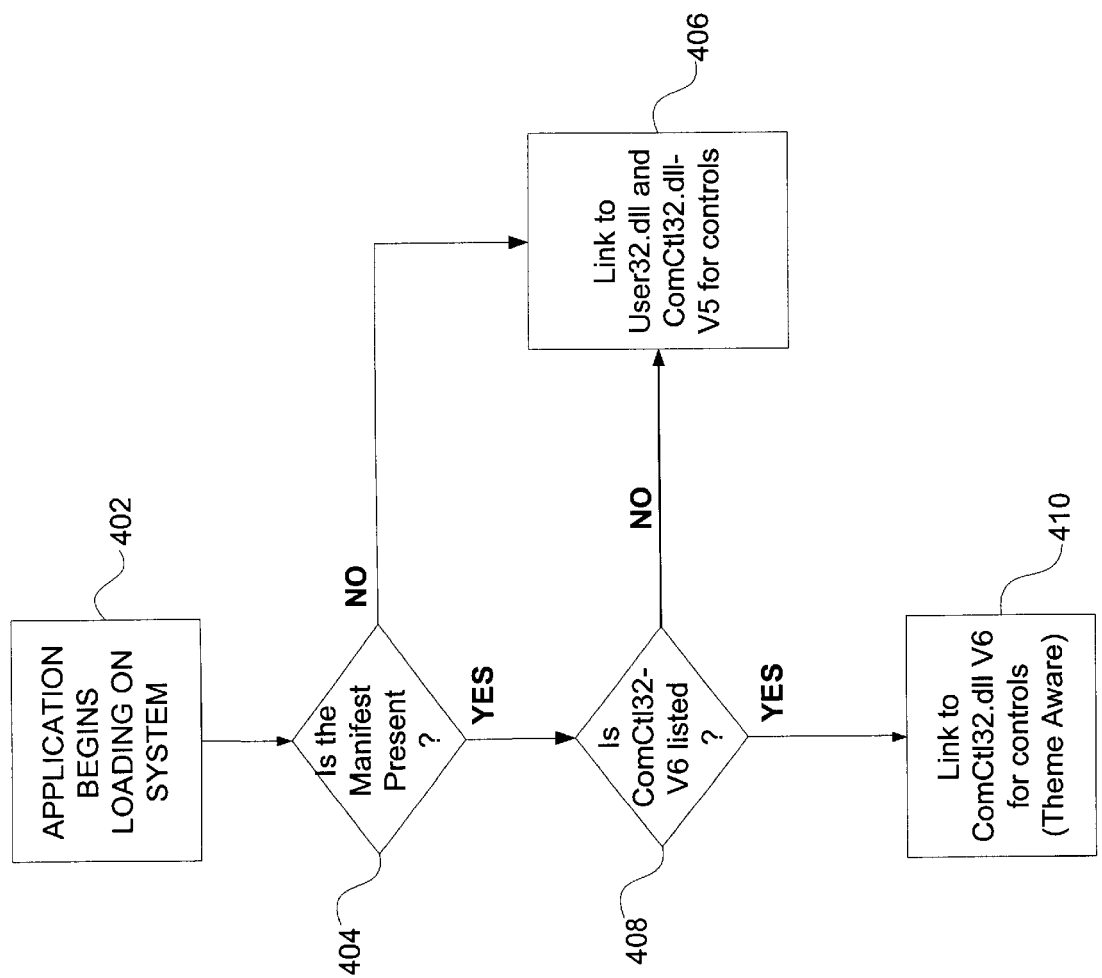
FIG. 4 is an operation flow diagram illustrating the fusion process.

Referring to FIG. 4, another embodiment of the logical operations implemented in fusion 214 (FIG. 1) is illustrated. In this embodiment the fusion operation is performed when the application is loaded rather than routing application requests through fusion as in FIG. 7. Fusion allows for older non-theming applications to operate as intended in a theming environment by linking the older non-theming controls to the older applications. Older, non-theming controls are provided in User32.dll and ComCtl32.dll Version 5 (V5). User32.dll provides user controls such as buttons, scroll bars, and list boxes. ComCtl32.dll V5 provides shell common controls, such as toolbars, list views, and tree views. Fusion 214 links the theming control file, ComCtl32.dll version 6 (V6), to new applications that have been developed and tested in a theming environment.

In FIG. 4 operation flow begins at loading operation 402 wherein an application begins running on the system. Part of the start-up processing is dynamic linking of controls libraries. Linking is the process of uniting references between program modules and libraries of subroutines to create a load module that is ready to run on the computer. After loading operation 402, control transfers to the manifest detection operation 404 wherein it is determined whether the application has a manifest associated with it. If there is not a manifest, control transfers to linking operation 406 wherein the traditional controls, User32.dll and ComCtl32.dll V5, are linked into the application's memory map. As mentioned earlier, the traditional controls are not theme aware.

If, on the other hand, there is a manifest, such as manifest 215, in manifest detection operation 404, control transfers to the theming module searching operation 408, wherein it is determined whether ComCtl32.dll V6 is listed in the manifest. If the manifest does not list ComCtl32.dll V6, control transfers to the linking operation 406, wherein the traditional controls are linked into the application's memory map. If, on the other hand, ComCtl32.dll V6 is listed in the manifest, transfer controls to linking operation 410 wherein the theme aware controls of ComCtl32.dll V6 are linked into the application's memory map.

Figure 5:
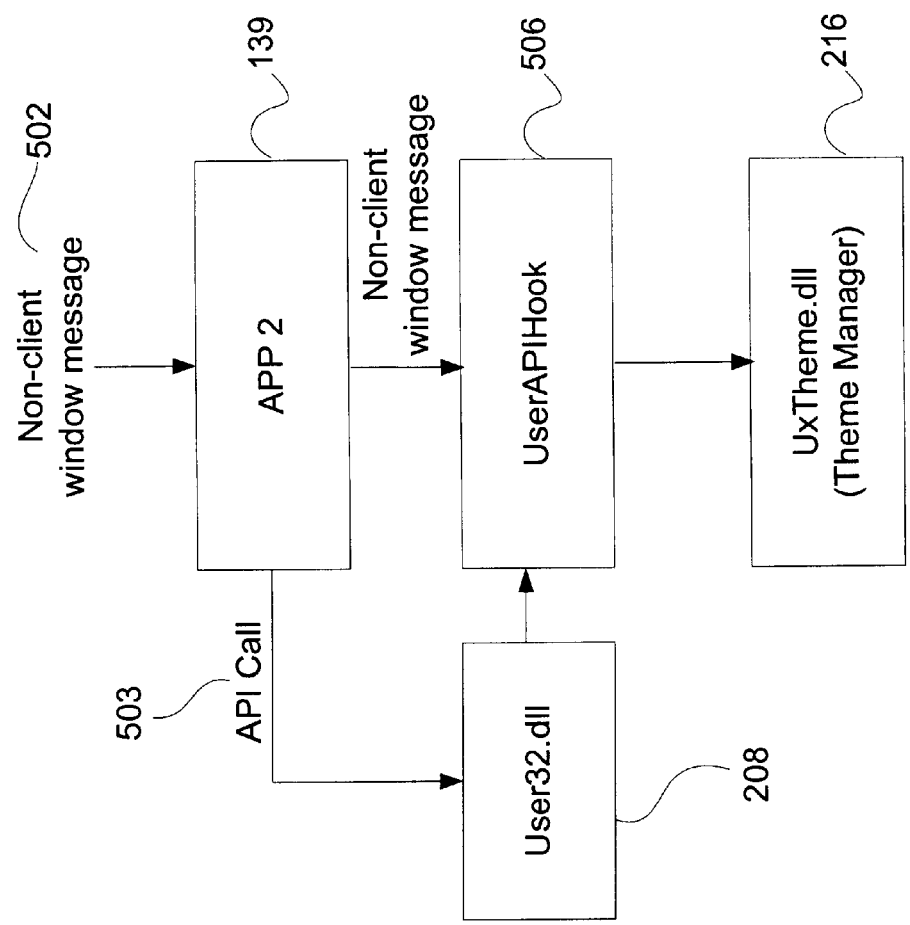
FIG. 5 is an operation flow diagram illustrating an exemplary process of theming window components.

FIG. 5 is an operation flow diagram illustrating an exemplary process of theming non-client window components in a theme aware application environment. FIG. 5 depicts how non-client window components may be rendered with theme properties in two general situations. The first situation is one in which a non-client window message, such as non-client window message 502, is directed to a window. The second situation is when an application makes an API call that may affect the non-client window area of a window, requiring the non-client window area to be re-rendered.

In the first situation, when a non-client window message 502 is generated, the non-client area of a target window may need to be rendered. The non-client area of the window typically has one or more non-client graphical components, such as a minimize box, window frame, and close box. The non-client window message 502 can be any message sent to the window, including, but not limited to, measurement or rendering messages. For example, when a computer user resizes a target window, a non-client window message 502 is sent to the window, requesting that the window be re-rendered at the new size. A non-client window message 502 is typically received by an application that is using the target window, such as APP2 139. The application, such as APP2 139, may perform an action, such as adjusting the appearance of its GUI, based on the non-client window message 502. The non-client window message 502 is then intercepted by a UserAPIHook 506, which routes the message to the theme manager 216. UserAPIHook 506 may be a part of the theme manager 216. The theme manager 216 interprets the non-client window message 502. Depending on the non-client window message 502, the theme manager 216 may make measurements regarding the dimensions of the non-client window components, and may use theme properties in the shared theme data 252 to render the non-client area of the window.

Continuing with the example of FIG. 5, when an application, such as APP2 139, or a control of an application, makes an API call, the result may affect the non-client area of the window. In this case, the non-client window area may be re-rendered using theme properties. For a theme aware application, such as application 139, an API call, such as API call 503, may be made to USER32 208. The API call 503 may be any API call, including, but not limited to any of the API functions discussed previously. For example, the "MoveWindow( )" API call can change the size, location, and z-ordering of the window, requiring the window frame to be redrawn. When a theme is active, USER32 208, upon receiving the API call 503, will route the API call 503 to UserAPIHook 506. UserAPIHook 506 then routes the API call 503 to the theme manager 216. The theme manager 216 interprets the API call 503 and makes measurement calculations regarding the dimensions of the window frame. The theme manager 216 then uses the shared theme data 252 to render the non-client window area with theme properties, if necessary.

In the embodiment of FIG. 5, USER32 208 handles non-client APIs and messages for both themed applications, such as APP1 138 of FIG. 1, and non-themed applications, such as APP2 139, as shown in FIG. 5. The message flow shown in FIG. 5 is the same for non-themed applications and themed applications. Thus, the non-client graphical components of windows are themed regardless of whether the application is theme aware or not.

Importantly, UserAPIHook operation 506 redirects rendering requests to the theme manager 216 that is able to use the shared theme data 252 to render the non-client area of the window with theme properties. As discussed earlier, theme property data can be added easily for window components by adding the property to the ".msstyles" file. This allows for a large variety of themes for non-client window components with no change to the control software.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Alternative embodiments of the present invention will become apparent to those skilled in the art to which it pertains upon review of the specification, including the drawing figures. Accordingly, the scope of the present invention is defined by the appended claims rather than the foregoing description.

Although the invention has been described in language specific to computer structural features, methodological acts and by computer readable media, it is to be understood that the invention defined in the appended claims is not necessarily limited to the specific structures, acts or media described. As an example, other decision methods may be included in the fusion process in combination with the control rendering modules. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A theme management system configured for rendering graphical components on a computer system having a graphical operating system running one or more applications, each application being able to make a request to be linked to a controls module, the theme management system comprising:
   a first controls module having one or more first functions responsive to application program interface calls capable of rendering graphical components with themes;
   a second controls module having one or more second functions responsive to application program interface calls capable of rendering graphical components without themes; and
   a fusion module that responds to the request by determining whether to link the application to one of the first controls module or the second controls module to render graphical components.

2. The theme management system of claim 1 further comprising a theme management module having one or more third functions responsive to rendering calls from the one or more first functions of the first controls module, the third functions capable of rendering graphical components using a theme.

3. The theme management system of claim 2 further comprising:
   an intercepting hook module that intercepts a non-client window message sent to a target window, the target window having one or more non-client graphical components in a non-client window area, the non-client window message requesting that the target window perform an action on the one or more non-client graphical components; and
   a first routing module that receives the non-client window message from the intercepting hook module and routes the non-client window message to the one or more third functions of the theme manager so that the action will be performed.

4. The theme management system of claim 3 wherein the first controls module further comprises a second routing module that routes an application program interface call to the intercepting hook module so that an action can be performed on the one or more non-client graphical components on the non-client window area in response to the application program interface call.

5. The theme management system of claim 3 wherein the second controls module further comprises a third routing module that routes an application program interface call to the intercepting hook module so that an action can be performed on the one or more non-client graphical components on the non-client window area in response to the application program interface call.

6. The theme management system of claim 3 wherein the non-client window message is a render message that requests that the one or more non-client graphical components on the non-client window area be rendered, the theme management module responding to the render message by rendering the one or more non-client graphical components.

7. The theme management system of claim 3 wherein each of the one or more non-client graphical components is associated with dimensions and the non-client window message is a measurement message that requests that the dimensions of the one or more non-client graphical component on the non-client window area be measured the theme management module responding to the measurement message by measuring the dimensions of the one or more non-client graphical components.

8. The theme management system of claim 1 wherein the first and second functions of the first and second controls modules are capable of rendering user controls and shell common controls.

9. A theme management system configured for rendering graphical components on a computer system having a graphical operating system running one or more applications, each application being able to make a request to be linked to a controls module, the theme management system comprising:
   a first controls module having one or more first functions responsive to application program interface calls capable of rendering graphical components with themes;
   a second controls module having one or more second functions responsive to application program interface calls capable of rendering graphical components without themes; and
   a fusion module that responds to the request by determining whether to link the application to one of the first controls module or the second controls module to render graphical components; the fusion module comprises:
      a first detecting module that detects whether an application has an associated manifest file that indicates which of a set of controls modules should be linked to the application;
      a second detecting module that detects whether the manifest indicates that the first controls module should be linked; and
      a linking module that links the first controls module to an application if the manifest indicates that the first controls module should be linked.

10. A theme management system configured for rendering graphical components on a computer system having a graphical operating system running one or more applications, the theme management system comprising:
   an intercepting hook module that intercepts a render message to a target window having non-client graphical components, the render message requesting that the target window render the target window's non-client graphical components;
   a theme manager module having one or more first functions capable of rendering any window's non-client graphical components using a theme; and
   a routing module that routes the render message to the one or more first functions of the theme manager module so that the target window's non-client graphical components are rendered using a theme having a set of theme properties;
   a first controls module having one or more second functions capable of interacting with the one or more first functions of the theme management module to render user controls or shell common controls having theme properties;
   a second controls module having one or more third functions capable of rendering user controls and shell common controls not having theme properties; and
   a fusion module responsive to a request from an application to link the application to one of the first controls module or the second controls module.

11. A method of rendering a graphical control on a computer display of a computer having a graphical operating system, a first set of applications implementing theme capability, and a second set of applications not implementing theme capability, the method comprising:
   providing a first controls module having one or more first functions capable of rendering graphical controls for applications not implementing theme capability;
   providing a second controls module having one or more second functions capable of rendering graphical controls for applications implementing theme capability;
   receiving a request from an application, requesting that the application be linked to one of the first controls module and second controls module;
   determining whether the application implements theme capability; and
   linking the application to the second controls module if the application implements theme capability, so that the application can use the functions of the second controls module to render graphical controls with themes.

12. The method of claim 11 further comprising:
   receiving an application program interface call from an application, the application program interface call requesting that a graphical control be rendered;
   determining whether the graphical control implements theme capability; and
   calling a theme manager that uses a theme file having graphical component property data to render the requested graphical control in a themed fashion if the graphical control implements theme capability.

13. The method of claim 11 wherein the act of determining comprises:
   detecting whether a manifest exists for the application; and
   searching the manifest for an indicator that indicates that the application is capable of interacting with the second controls module to render graphical controls with themes.

14. The method of claim 12 further comprising:
   intercepting a non-client window message sent to a window having one or more non-client graphical components, the non-client window message requesting that the window perform an action on the one or more non-client graphical components;
   routing the non-client window message to the theme manager that manages theme properties for non-client graphical components; and
   performing the action on the one or more non-client graphical components.

15. The method of claim 14 wherein the non-client window message is a render message and the action is rendering the one or more non-client graphical components.

16. The method of claim 14 wherein the non-client window message is a measurement message, each of the one or more non-client graphical components are associated with dimensions, and the action is measuring the dimensions of the one or more non-client graphical components.

17. The method of claim 12 further comprising:
   routing the application program interface call to an intercepting hook module;
   routing the application program interface call to the theme manager that renders non-client graphical components in a themed fashion;
   determining whether the application program interface call affects one or more non-client graphical components of a window being used by the application; and
   rendering the one or more non-client graphical components in the themed fashion if the application program interface call affects the one or more non-client graphical components.

18. A computer program product readable by a computing system and encoding a computer program of instructions for executing a computer process for rendering a graphical control on a computer display of a computer having a graphical operating system, a first set of applications implementing theme capability, and a second set of applications not implementing theme capability, the computer process comprising:
   receiving a request from an application, requesting that the application be linked to one of the first controls module and second controls module;
   determining whether the application implements theme capability; and
   linking the application to the second controls module if the application implements theme capability, so that the application can use the functions of the second controls module to render graphical controls with themes.

19. The computer program product of claim 18 wherein the computer process further comprises:
   receiving an application program interface call from an application, the application program interface call requesting that a graphical control be rendered;
   determining whether the graphical control implements theme capability; and
   calling a theme manager that uses a theme file having graphical component property data to render the requested graphical control in a themed fashion if the graphical control implements theme capability.

20. The computer program product of claim 18 wherein the act of determining comprises:
   detecting whether a manifest exists for the application; and
   searching the manifest for an indicator that indicates that the application is capable of interacting with the second controls module to render graphical controls with themes.

21. The computer program product of claim 19 wherein the computer process further comprises:
   intercepting a non-client window message sent to a window having one or more non-client graphical components, the non-client window message requesting that the window perform an action on the one or more non-client graphical components;
   routing the non-client window message to the theme manager that manages theme properties for non-client graphical components; and
   performing the action on the one or more non-client graphical components.

22. The computer program product of claim 21 wherein the non-client window message is a render message and the action is rendering the one or more non-client graphical components.

23. The computer program product of claim 21 wherein the non-client window message is a measurement message, each of the one or more non-client graphical components is associated with dimensions, and the action is measuring the dimensions of the one or more non-client graphical components.

* * * * *